(12) United States Patent
Meier

(10) Patent No.: US 7,849,217 B2
(45) Date of Patent: Dec. 7, 2010

(54) MOBILE ETHERNET

(75) Inventor: Robert C. Meier, Cuyahoga Falls, OH (US)

(73) Assignee: Cisco Technology, Inc., San Jose, CA (US)

( * ) Notice: Subject to any disclaimer, the term of this patent is extended or adjusted under 35 U.S.C. 154(b) by 2033 days.

(21) Appl. No.: 10/426,429

(22) Filed: Apr. 30, 2003

(65) Prior Publication Data
US 2004/0221042 A1 Nov. 4, 2004

(51) Int. Cl.
G06F 15/16 (2006.01)
G06F 15/173 (2006.01)

(52) U.S. Cl. .................. 709/245; 709/202; 709/229; 709/238; 709/239

(58) Field of Classification Search .................. 709/204, 709/228, 238, 245, 224; 370/329, 389, 239
See application file for complete search history.

(56) References Cited

U.S. PATENT DOCUMENTS

| | | | | |
|---|---|---|---|---|
| 6,195,705 | B1 * | 2/2001 | Leung | 709/245 |
| 6,243,758 | B1 * | 6/2001 | Okanoue | 709/238 |
| 6,535,493 | B1 * | 3/2003 | Lee et al. | 370/329 |
| 6,636,498 | B1 * | 10/2003 | Leung | 709/245 |
| 6,701,361 | B1 * | 3/2004 | Meier | 709/224 |
| 7,161,914 | B2 * | 1/2007 | Shoaib et al. | 370/331 |
| 2002/0078238 | A1 * | 6/2002 | Troxel et al. | 709/245 |
| 2002/0133534 | A1 | 9/2002 | Forslow | |
| 2003/0018715 | A1 * | 1/2003 | O'Neill | 709/204 |
| 2003/0182433 | A1 * | 9/2003 | Kulkarni et al. | 709/228 |
| 2003/0193910 | A1 * | 10/2003 | Shoaib et al. | 370/331 |
| 2004/0148428 | A1 * | 7/2004 | Tsirtsis | 709/238 |
| 2006/0062214 | A1 * | 3/2006 | Ng et al. | 370/389 |

FOREIGN PATENT DOCUMENTS

EP 0740440 A2 10/1996

OTHER PUBLICATIONS

C. Perkins, Ed. "IP Mobility Support for IPv4", Nokia Research Center, Jan. 2002, pp. 1-98.
Gary Spiess, "Inter-Access Point Protocol Proposal", XP-002310078, Oct. 16, 2000, pp. 6.
Jin Xiaohui and Li Jiandong, "IAPP Enhancement Protocol", pp. 340-344.

* cited by examiner

*Primary Examiner*—Quang N. Nguyen
(74) *Attorney, Agent, or Firm*—Tucker Ellis & West LLP

(57) ABSTRACT

A Mobile Ethernet Protocol that is used to logically extend a "home VLAN", through an Ethernet/IP "campus network", to mobile nodes on "foreign subnets". The network architecture used for Mobile Ethernet is hierarchical and includes a Subnet Context Manager per subnet and a central Campus Context Manager. The protocol is generally based on the standard Mobile IPv4 protocol, but includes significant extensions to standard Mobile IP including using an 802 address as the permanent MN identifier, rather than an IP address, encapsulating and sending Ethernet frames through IP tunnels, and configuring a single Mobile Ethernet HA to provide access to multiple home VLANs wherein Home VLAN bindings for MNs are dynamically established. A MN does not need to be configured with a permanent IP address.

57 Claims, 3 Drawing Sheets

Mobile Ethernet components are illustrated in the figure below:

Mobile Ethernet components are illustrated in the figure below:

MOBILE ETHERNET

BACKGROUND OF THE INVENTION

The present invention is generally related to mobile communications, and more particularly to a method for extending a home Virtual Local Area Network (VLAN) through an Ethernet/IP campus network to mobile nodes on foreign subnets.

A Virtual Local Area Network (VLAN) is a logical grouping of two or more nodes which are not necessarily on the same physical network segment but which share the same network number. A large or campus network may contain multiple VLANs that provide equivalent services. For example, a campus network may contain multiple Voice VLANS. As a node roams from its home subnet to a foreign subnet messages to and from the node need to be properly routed.

Standard Mobile IP supports seamless subnet mobility for IP applications only. However standard Mobile IP is not currently widely used primarily because it is not widely supported by existing conventional (i.e. Microsoft) TCP/IP protocol sacks. Furthermore, Standard Mobile IP does not support non-IP protocols.

Thus a need exists for a solution that enables seamless inter-subnet mobility for non-IP mobile nodes. Furthermore, the need exists for a solution which supports both IP and non-IP protocols wherein a mobile node does not need to be configured with a permanent IP address.

Unless otherwise defined, the following definitions should be used. Terms not defined should be given their ordinary or customary meaning as defined by the Institute of Electrical and Electronics Engineers 802.11 standard, hereby incorporated by reference.

802.11— The 802.11 protocol and 802.11 terms are defined by the Institute of Electrical and Electronics Engineers (IEEE) 802.11 standard.

802 address—In this document, an "802 address" is a canonical IEEE 48-bit "Ethernet" address. 802.11 and Ethernet addresses are 802 addresses.

AP—802.11 access point.

AP Subnet—APs are grouped per IP subnet. A single Subnet Context Manager (SCM) is elected for each AP subnet. An AP and SCM provide access to MNs that belong to different subnets via standard VLAN trunking.

CCM—Campus Context Manager, a central context manager that issues security credentials for a mobile node's foreign agent and home agent. Mobile Ethernet agents authenticate and establish a separate secret key with the campus context manager. The campus context manager is used by the foreign agent and home agent to establish a shared secret key with each other. A MN "home VLAN bindings" are stored in the CCM for a "campus network" and are distributed, as required, as a MN roams. The CCM functions as an "authenticator" and key distribution center (KDC) for SCMs and APs.

Campus Network—A "campus network" is an aggregate "seamless roaming domain", which implies a geographic locality. A campus network may include 1 or more 802.11 Extended Service Sets, where an Extended Service Set is identified by a Service Set Identifier (SSID), as defined in the IEEE 802.11 specification.

CH—Correspondent Host. A mobile or non-mobile node that is actively communicating with a MN.

FA—Foreign Agent. In this document, a foreign agent is a Mobile Ethernet foreign agent, unless explicitly noted otherwise.

HA—Home Agent. In this document, a home agent is a Mobile Ethernet home agent, unless explicitly noted otherwise.

HA Bridge—A HA Bridge is co-located with each Mobile Ethernet HA. The HA Bridge is responsible for bridging Ethernet frames, for a MN on a foreign subnet, between the MN's "home VLAN" and the co-located HA.

Home VLAN Bindings—A Mobile Ethernet MN is bound to a home subnet or "home VLAN". The "home VLAN bindings include the MN 802 address, MN IP address (if it exists), current SCM/HA IP address, and "home VLAN ID".

HA/FA—A combined Mobile Ethernet home and foreign agent. In a simple implementation, an HA/FA is a software entity in an SCM.

IGMP—Internet Group Management Protocol. IGMP is used to determine IP multicast group membership.

IGMP Snooping—Switches and APs "snoop" IGMP messages, received on a port, to determine which IP multicast addresses must be transmitted on the port.

MIP—Mobile IPv4 as defined in Internet Engineering Task Force (IETF) RFC 2002 and IETF RFC 3220.

MN—802.11 Mobile Node.

Network Access Identifier (NAI)—An NAI is used to identify a user within a network domain. For example, "joe@cisco.com" is a typical NAI.

SCM—Subnet Context Manager. A single SCM provides a central control point for each AP subnet. From the perspective of a MN, a home SCM is the SCM of the home VLAN for the MN and a foreign SCM is an SCM on any other "foreign subnet". An SCM/HA is a home SCM and co-located Mobile Ethernet home agent. An SCM/FA is a foreign SCM and co-located Mobile Ethernet foreign agent.

Seamless roaming. A MN is said to roam "seamlessly" if it roams between APs in different subnets without changing its "home IP address".

SSID—802.11 Service Set Identifier. An SSID identifies a set of MNs grouped into a logical "service set", and the APs that provide access for the service set. Mobile Ethernet is enabled or disabled per SSID. An SSID is implicitly or explicitly bound to a VLAN ID. By default, an SSID is bound to the local SCM/HA. An SSID can be explicitly bound to a remote "home SCM/HA" and remote home VLAN.

VLAN—A "Virtual LAN", as defined in the IEEE 802.1Q standard. VLAN-tagged frames are transmitted on a VLAN Trunk link.

WLAN—Wireless LAN.

WLCCP—Wireless LAN Context Control Protocol. A protocol wherein the central context manager is used to authenticate a home agent and a foreign agent. The protocol uses encrypted messages using keys exchanged during the authentication step. Furthermore, a protocol that enables a foreign agent and a home agent to establish a secret key between them via the central context manager. WLCCP is used to cache and securely distribute home VLAN bindings and other mobility context for MNs. WLCCP registration triggers Mobile Ethernet registration. Mobile Ethernet security is facilitated by the WLCCP security infrastructure.

BRIEF SUMMARY OF THE INVENTION

In view of the aforementioned needs, the invention contemplates a method for inter subnet mobility on a campus network comprising a plurality of Ethernet subnets interconnected by Internet Protocol routers comprising the steps of logically binding a mobile node with an 802 Media Access Control Address to a single home subnet by the mobile node's 802 Media Access Control address, storing home subnet bindings wherein the home subnet bindings are accessible throughout the network, maintaining mobility bindings for a mobile node by a home agent on a home subnet; and sending a registration message when the mobile node first roams to the foreign subnet, wherein the registration message comprises the 802 Media Access Control address of the mobile node and an Internet Protocol address of a tunnel endpoint on the foreign subnet is sent to the home agent for the mobile node's home subnet.

In a preferred embodiment, the method contemplates identifying mobility bindings by 802 Media Access Control address, the mobility bindings comprising an Internet Protocol Address of a tunnel endpoint on a foreign subnet where the mobile node is currently located and an Internet Protocol Address of a tunnel endpoint on a home AP subnet. The mobility bindings are indexed by 802 Media Access Control addresses, The foreign agent maintains mobility bindings for a visiting mobile on the foreign subnet, wherein the mobility bindings for a visiting node comprises an Internet Protocol address of the home agent on the mobile node's home AP subnet. The home agent intercepts 802 frames transmitted by either a correspondent host and/or a router on a home subnet wherein the destination 802 address is enabled on the mobile node on the foreign subnet, encapsulates the intercepted frames with an Internet Protocol encapsulation header having an Internet Protocol destination address by the home agent, wherein the Internet Protocol destination address is set to the tunnel endpoint on the foreign subnet via normal Internet Protocol routing. The home agent redirects 802 frames transmitted on the home subnet using standard bridge source learning when a unicast 802 address identifies the mobile node on the foreign subnet to the home agent on the mobile node's home subnet. The foreign agent intercepts non-Internet Protocol frames transmitted by the mobile node visiting the foreign subnet, locates the mobility bindings for the mobile node using the source 802 address of the frame, encapsulates the non-Internet Protocol frame with an Internet Protocol encapsulation header having a header with a destination address, the destination address being set to the home agent on the mobile node's home subnet; and forwards the encapsulated frame using normal Internet Protocol routing. Normally the non-IP frame is either a unicast 802 frame or a multicast 802 frame.

Another aspect of the present invention contemplates that the campus network comprises a plurality of Access Points, each Access Point is configured with at least one 802.11 service set identifier, the mobile node is configured with an 802.11 service set identifier that matches at least one of the Access Point service set identifiers. Each Access Point service set identifier is bound to one of the group consisting of a default home subnet and a home Virtual Local Area Network, at least one service set identifier has Mobile Ethernet enabled, and sending at least one message by the mobile node with its service set identifier to a selected parent Access Point. When the access point receives a message from the mobile node it examines the message's service set identifier and initiates Mobile Ethernet services. The mobile node is bound to the home subnet bound to the mobile node's Service Set Identifier in the mobile node's initial parent Access Point when the mobile node first enters the network. The present invention dynamically obtains an Internet Protocol address for the mobile node that is in the mobile node's home subnet using Dynamic Host Configuration Protocol. The present invention further contemplates binding the mobile node to a local home subnet, wherein layer 2 dynamic host configuration protocol request and reply frames are bridged between the local home subnet and the mobile node by the mobile node's parent Access Point. In addition, the method contemplates binding the mobile node to a remote home subnet, encapsulating Dynamic Host Configuration Protocol request and reply frames with an Internet Protocol encapsulation header, and forwarding the Dynamic Host Configuration Protocol request and reply frames between the mobile node and the remote home subnet on an Internet Protocol tunnel that exists between the home agent on the remote home subnet and the tunnel endpoint on the mobile node's local foreign subnet. The home agent then examines the 802 Media Access Control Address in the body of a broadcast Dynamic Host Control Protocol reply message to determine if the message is destined to the mobile node on the foreign subnet, and if so locates mobility bindings for the mobile node, encapsulates the Dynamic Host Control Protocol message with an Internet Protocol encapsulation header; and forwards the Dynamic Host Control Protocol message to the tunnel endpoint identified by the Internet Protocol address in the mobile node's mobility bindings.

The default home subnet is bound to a single Service Set Identifier that varies by location so that home subnets can be localized and so that mobile nodes can be bound to the closest home subnet. Home subnet bindings are discarded after a predetermined period of inactivity. When the mobile node roams to a new subnet after its home subnet bindings have been discarded, it is bound to a new home subnet.

When the home subnet is a Virtual Local Area Network identified by an integer Virtual Local Area Network Identifier, the home subnet bindings for the mobile node further comprise the Virtual Local Area Network Identifier. The home agent provides access to a plurality of home subnet bindings for a mobile node visiting a foreign subnet. The home agent examines the source IP address from IP and ARP packets transmitted by the mobile node and binds the mobile node to a home subnet that corresponds to the mobile node's IP address.

The present invention further contemplates the mobile node being explicitly assigned to the home subnet.

In addition, the preferred embodiment contemplates storing the current home subnet bindings for the mobile node in a context manager within the network infrastructure, sending a context request message to the context manager to obtain the home subnet bindings for a mobile node when the mobile node first associates with a parent Access Point, and returning to the parent Access Point the current home subnet bindings and Mobile Ethernet registration state information for a mobile node in a context response message. The context request message may contain default home subnet bindings for the mobile node and the default bindings are established as the current home subnet bindings for the mobile node if the context manager does not have any previous home subnet bindings for the mobile node.

The home agent intercepts broadcast ARP messages having a target IP address on the home subnet where the target IP address in the ARP message identifies a mobile node on a foreign subnet, the home agent encapsulates the broadcast ARP message with an IP encapsulation header, and forwards the encapsulated Address Resolution Protocol message to an Internet Protocol tunnel endpoint on the foreign subnet.

The present invention also contemplates grouping mobile nodes visiting a foreign subnet into at least one isolated broadcast domain wherein layer 2 multicast frames that originate on the home subnet are not received by local stations on a foreign subnet, or grouping mobile nodes visiting a foreign subnet into at least one isolated broadcast domain wherein the mobile nodes visiting the foreign subnet do not receive level 2 multicast frames that originate on the foreign subnet. A multicast frame that originates on the home subnet is encapsulated with a layer 2 encapsulation header containing a broadcast domain identifier, which is then forwarded to the foreign subnet.

In yet another aspect of the present invention there is contemplated relaying an Internet Group Management Protocol message sent by the mobile node on the foreign subnet onto a local foreign subnet for the purpose of extending domain of an Internet Protocol multicast group to the local foreign subnet. This further contemplates examining the Internet Group Management Protocol message sent by the mobile node to determine a set of Internet Protocol multicast packets to be forwarded to visiting mobile nodes, and forwarding Internet Protocol multicast packets transmitted on the foreign subnet to mobile nodes visiting the foreign subnet.

In still yet another aspect, it is contemplated that Mobile Ethernet foreign agent logic and Internet Protocol tunnel endpoints are contained in a Mobile Ethernet aware mobile node. This embodiment further contemplates isolating the Mobile Ethernet foreign agent logic in a low-level Mobile Ethernet driver module so that Mobile Ethernet is transparent to higher-layer protocol modules.

Another aspect of the present invention contemplates that the network further comprises a network address translator that enables the mobile node to communicate with external Internet Protocol nodes. The method would further comprise assigning the mobile node with a non-routable private Internet Protocol address, encapsulating all Internet Protocol frames transmitted by the mobile node on the foreign subnet, and forwarding the encapsulated frames to the mobile nodes home subnet, wherein any frames destined to the mobile node are routed through the network address translator. In addition the method contemplates assigning the same private Internet Protocol address to at least two mobile nodes wherein Mobile Ethernet agents use the 802 Media Access Control address to uniquely identify the mobile nodes.

Another aspect of the present invention contemplates that the home subnet is a Virtual Local Area Network identified by an integer Virtual Local Area Network Identifier, and the home subnet bindings for the mobile node further comprising the Virtual Local Area Network Identifier. The method would further comprise relaying frames between the mobile node and the mobile node's home Virtual Local Area Network by layer 2 bridging when the mobile node's home Virtual Local Area Network is enabled on a Virtual Local Area Network trunk linked to the mobile node's parent Access Point, and relaying frames using Internet Protocol tunneling between the mobile node and the mobile node's home Virtual Local Area Network when the mobile node's home Virtual Local Area Network is not enabled on a Virtual Local Area Network trunk linked to the mobile node's parent Access Point. This aspect further contemplates that layer 2 bridging is automatically used to access the mobile node's home Virtual Local Area Network if the Virtual Local Area Network Identification contained in the mobile node's current home subnet bindings matches a Virtual Local Area Network Identification enabled on the trunk link to the mobile node's parent Access Point.

Yet another aspect of the present invention contemplates automatically establishing the home agent for each home subnet via an election protocol and a new home agent is elected if the home agent is lost.

Still yet another aspect of the present invention contemplates registering each home agent for each home subnet with a central context manager. The method would further comprise notifying Mobile Ethernet agents on foreign subnets by the central context manager when a new home agent is elected for a home subnet so that foreign agents re-register mobile nodes with the new home agent.

Another aspect of the present invention contemplates that the method authenticates each node that has Mobile Ethernet mobility agents with a common context manager, establishes a separate secret key between each node that has Mobile Ethernet mobility agents and the common context manager, issue security credentials for a mobile node's foreign agent and home agent by the common context manager, and establish a shared secret key between the foreign agent and the home agent via the common context manager, wherein the shared secret key is used to authenticate messages exchanged by the home agent and the foreign agent.

The present invention contemplates significant extensions to standard Mobile IP which include the following:

An 802 address is used as the permanent MN identifier, rather than an IP address.

Ethernet frames are encapsulated and sent through IP tunnels; therefore, Mobile Ethernet can provide seamless mobility for non-IPv4 protocols (e.g. IPv6).

A single Mobile Ethernet HA can provide access to multiple "home VLANs.

By default, home VLAN bindings for MNs are dynamically established.

A "proxy MN" in the network infrastructure provides proxy registration services for Mobile-Ethernet-unaware MNs.

Proxy-MN/HA security relationships are dynamically established, as required, and replace standard Mobile IP HA/MN security relationships.

Mobile Ethernet solves mobility problems related to ARP, DHCP, NAT, internal enterprise firewalls and it supports both IP and non-IP protocols.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

Figure 3:
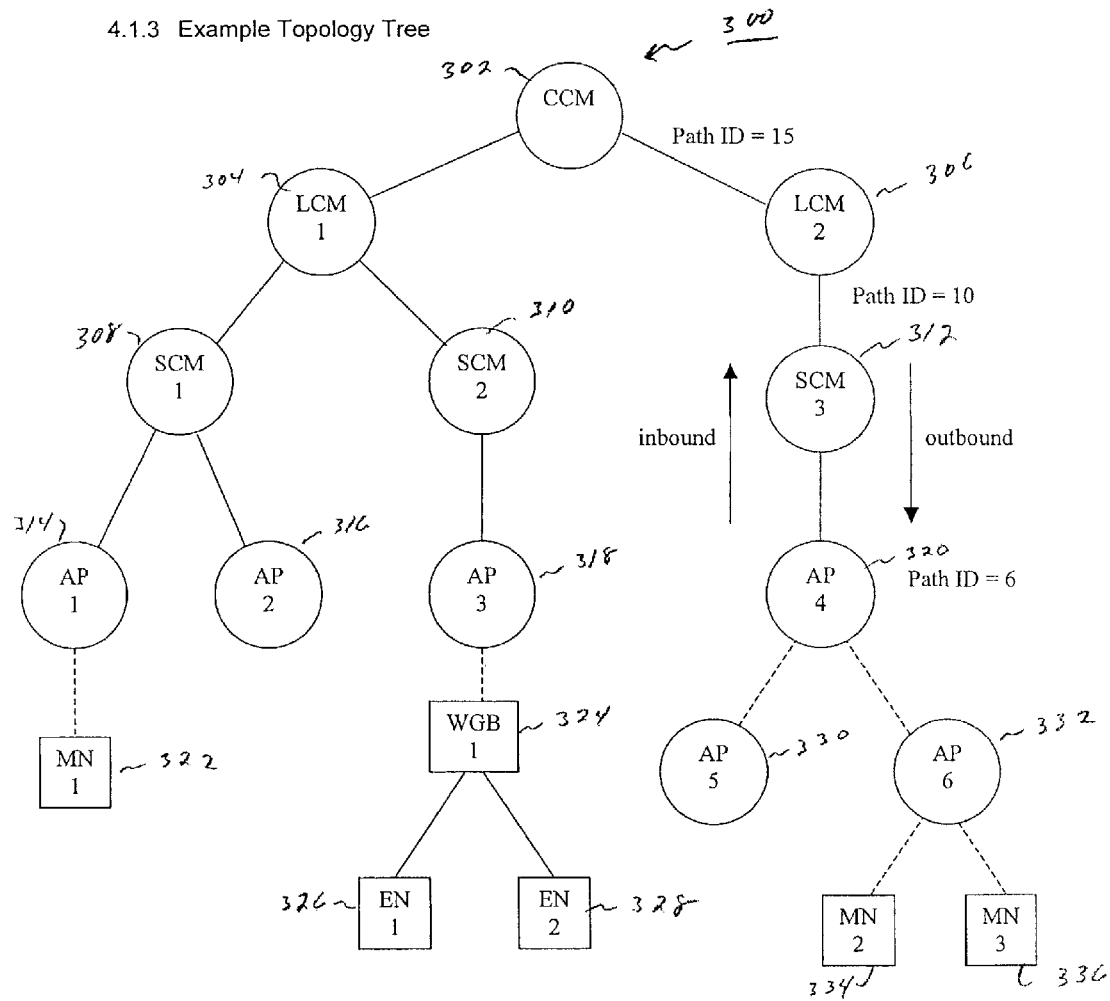
FIG. 3 is a block diagram of a hierarchical network architecture.

Referring first to FIG. 3, there is illustrated a typical hierarchical network 300. A campus context manager (CCM) 302 issues security credentials for a mobile node's foreign agent and home agent. Mobile Ethernet agents authenticate and establish a separate secret key with the CCM 302. The CCM 302 is used by the foreign agent and home agent to establish a shared secret key with each other. A MN "home VLAN bindings" are stored in the CCM 302 for a "campus network" and are distributed, as required, as a MN roams. The CCM 302 functions as an "authenticator" and key distribution center (KDC) for SCMs and APs. The network 300 has two local control domains, each having a local context manager, LCM 304 for the first domain and LCM 306 for the second domain. LCM 304 has two Subnet Context Managers (SCM) 308 and 310 underneath it. LCM 306 has only one SCM 312 underneath it. A Subnet Control Domain includes all APs that are in the same subnet as the respective SCM and any client stations that are directly, or indirectly, associated with those APs. For example, it includes any MNs that are associated with those APs, even if a MN is assigned to a different subnet at the network layer via VLAN trunking or MIP tunneling. It also includes any ENs attached to secondary LANs that are bridged to the Primary LAN. A single SCM provides a central control point for each AP subnet. From the perspective of a MN, a home SCM is the SCM of the home VLAN for the MN and a foreign SCM is an SCM on any other "foreign subnet". An SCM/HA is a home SCM and co-located Mobile Ethernet home agent. An SCM/FA is a foreign SCM and co-located Mobile Ethernet foreign agent.

SCM 308 has two APs 314 and 316. MN 322 is shown connected to AP 314. SCM 310 has one AP 318. AP 318 is connected to a WorkGroup Bridge 324 which has two enhanced nodded 326 and 328. LCM 306 with SCM 312 has only AP 320, however, AP 320 is connected to AP 330 and AP 332, and Mobile Nodes 334 and 336 are currently attached to AP 332.

It should be noted that some of the components in the network 300 may be combined or may not be needed. For smaller networks, LCMs 304 and 306 may not be necessary, thus SCMs 308, 310 and 312 may communicate directly to the CCM 302.

The present invention contemplates several components for implementing Mobile Ethernet.

A Mobile Ethernet "home agent" (HA) and "foreign agent" (FA) provide IP tunneling services for MNs on a foreign subnet, much like standard Mobile IP home and foreign agents. By default, a single, combined Mobile Ethernet HA/FA is elected for each 802.11 AP subnet, from a set of HA/FA candidates. Alternatively, multiple Mobile Ethernet HAs and FAs can be configured for each AP subnet.

The Wireless LAN Context Control Protocol, WLCCP, is used to cache and securely distribute home VLAN bindings and other mobility context for MNs. WLCCP registration triggers Mobile Ethernet registration. Mobile Ethernet security is facilitated by the WLCCP security infrastructure, such as shown for example in FIG. 3, however, any secure infrastructure wherein the Mobile Ethernet agents can securely communicate are acceptable.

The default Mobile Ethernet HA/FA for each AP subnet is co-located with the active Subnet Context Manager (SCM) for each AP subnet. "SCM/HA" refers to a "home" SCM and the co-located HA. Likewise, "SCM/FA" refers to a "foreign" SCM and the co-located FA.

A Mobile Node (MN) can roam seamlessly across IP subnet boundaries. The permanent Mobile Ethernet identifier for a MN is a 48-bit 802 Address. [Ethernet and 802.11 both use 48-bit 802 addresses.] Mobile Ethernet can be selectively enabled for a subset of MNs in a campus network. Herein, it is assumed that Mobile Ethernet is enabled for a MN, unless explicitly stated otherwise.

Proxy Mobile Node software entities exist in 802.11 APs and the SCM for each AP subnet. A Mobile Ethernet MN software entity can also exist beneath the network protocol stack in a mobile host. Mobile Ethernet MN software is transparent to higher-layer protocols and applications.

A Mobile Ethernet Registration Protocol is used to register a MN with its HA and establish IP tunnels. The Mobile Ethernet Registration Protocol is consistent with the Mobile IP registration protocol defined in RFC 2002 and RFC 3220 (Mobile IP). A proxy MN entity in a "foreign" SCM (F-SCM) provides proxy Mobile Ethernet Registration services for Mobile Ethernet-unaware mobile stations on foreign subnets.

A "forward IP tunnel" is used to tunnel IP packets and 802 frames that originate on a home VLAN "outbound" from a HA to a FA on a foreign 802 subnet. A "reverse IP tunnel" (RFC 2344) is used to tunnel (i.e. non-IP) 802 frames "inbound" from a FA or a proxy MN in a parent AP, on a foreign subnet, to a HA, for delivery on the home VLAN. [A parent AP can only terminate a reverse tunnel for a "proxy" MN.]

The HA exists on top of a logical HA Bridge Port, which may be a VLAN trunk port. Ethernet addresses for MNs on foreign subnets are statically enabled on the HA Bridge Port. The HA Bridge Port includes a DHCP Filter and an ARP Filter. Any VLAN IDs that are enabled on APs in the local AP subnet must also be enabled on the HA Bridge Port.

Each active SCM and its registered descendant APs belong to a single "AP subnet".

An Ethernet Bridge is co-located with a Mobile Ethernet HA to "bridge" 802 frames between "home VLANs" (i.e. via other bridge ports) and the Mobile Ethernet HA Bridge Port. A single Mobile Ethernet HA and co-located HA Bridge Port can provide access to multiple "home" VLANs via VLAN trunking. Any VLAN that is enabled on any APs in an AP subnet must also be enabled on the HA Bridge Port for the AP subnet.

Figure 1:
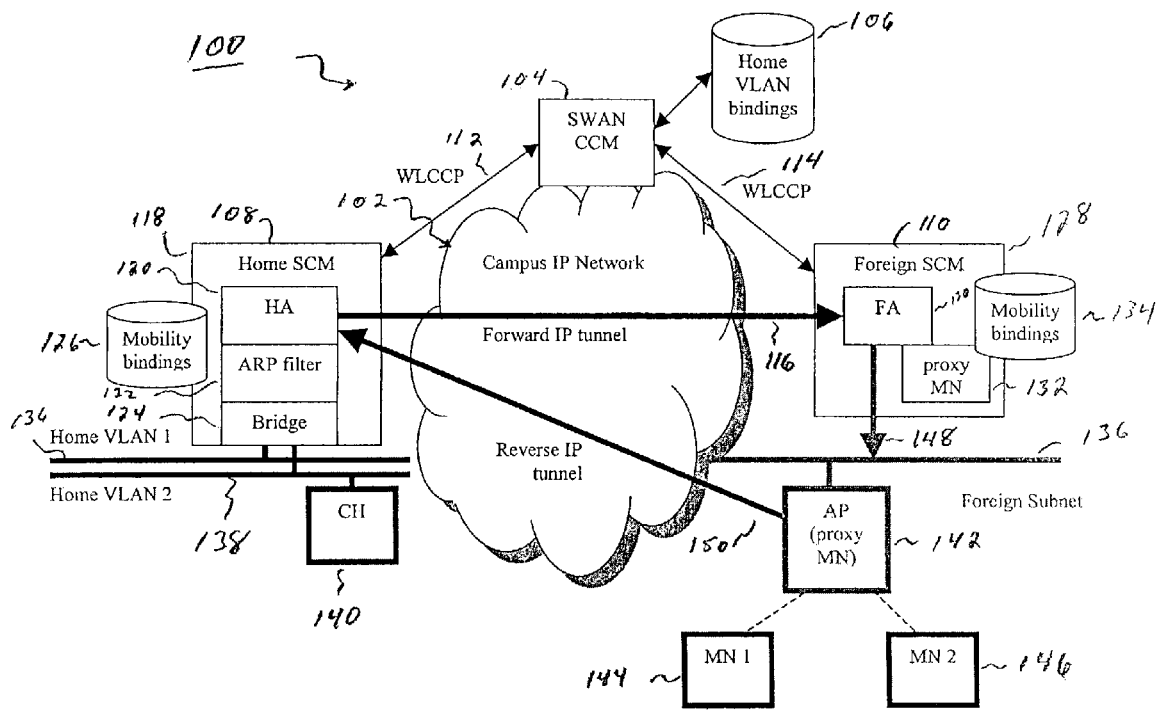
FIG. 1 is a block diagram of the Mobile Ethernet components.

Referring now to FIG. 1 there is shown a typical network topology 100 with the Mobile Ethernet components. At the top of the network's hierarchical topology is the campus context manager (CCM) 104. The CCM is connected to a data storage unit 106 containing the Home VLAN bindings. In the network 100 as shown, there are two SCMs, the first is the Home SCM 108, and the other is the Foreign SCM 110. WLCCP communication is used for communication between SCMs 108 and 10 and the CCM 104 along paths 112 and 114 respectively. Communications between the CCM 104, Home SCM 108 and Foreign SCM 110 occurs on a campus IP Network 102.

The Home SCM 108 comprises a Home Agent (HA) 120, ARP filter 122 a HA Bridge 124, and data storage 126 for the mobility bindings. The HA Bridge 124 is connected to Home VLAN1 136 and Home VLAN2 140. CH 140 is connected to Home VLAN2 138.

The Foreign SCM 110 comprises the FA 130, proxy MN 132 and mobility bindings 134. The FA 130 is connected to the Foreign Subnet 137. The Foreign Subnet 137 is also connected to AP 142 (a proxy MN) and AP 142 is connected to MN1 144 and MN2 146. The home VLAN for MN1 144 is Home VLAN1. The home VLAN for MN2 146 is Home VLAN2.

As shown in FIG. 1, the HA 120 uses a forward IP tunnel 116 to communicate with the FA 130. The FA uses a Forward data-link tunnel 148 to communicate with AP 142. AP 142 then communicates with the HA using Reverse IP tunnel 150.

Protocol Overview:

The permanent Mobile Ethernet identifier for a MN is an 802 (i.e. Ethernet) address. Therefore, a MN can be dynamically bound to a home VLAN via DHCP.

In a simple implementation, a Mobile Ethernet HA/FA exists as a software entity in an active SCM. The WLCCP "active SCM election" protocol is used to elect a single combined SCM/HA/FA for each 802.11 AP subnet. A new SCM/HA/FA is automatically elected if an active SCM/HA/FA fails.

Each combined SCM and HA/FA is registered with the campus CCM.

. If a new SCM/HA is elected for a subnet, then the CCM notifies each other registered SCM/FA, so that Mobile Ethernet MNs can be automatically re-registered with the new HA.

The SCM/HA for each AP subnet functions as the home agent for each VLAN that is enabled on any APs in its subnet. The co-located "HA Bridge Port" accesses "non-native" VLANs via the IEEE 802.1Q VLAN trunking protocol.

Home VLAN Bindings:

A MN is bound to a "home VLAN". A MN is "at home" if it is associated with a parent AP that has Ethernet access to the MN's home VLAN (i.e. via VLAN trunking); otherwise, a MN is "visiting" a "foreign subnet".

A MN is generally bound to a home VLAN as described in the WLCCP specification [2]. The "home VLAN bindings" for a MN include a home SCM/HA IP address and a home VLAN ID. By default, a MN is bound to the local SCM/HA and the default local VLAN ID for its SSID, when it initially associates to an AP anywhere in the campus network.

An AP SSID can be explicitly configured with a remote SCM/HA subnet ID, so that a MN can be explicitly bound to a remote home VLAN. [The ability to explicitly bind a MN to a remote home VLAN enables the network administrator to segregate MNs, for security purposes, on APs that do not have VLAN trunking enabled. It also enables a network administrator to explicitly bind a MN with a permanent IP address to the home subnet identified by the subnet prefix of the permanent IP address.] DHCP tunneling enables a DHCP MN to obtain an IP address on a remote subnet.

A MN can also be bound to the home VLAN that corresponds to its source IP address.

The current home VLAN bindings for a MN are stored in the campus CCM and are distributed to the new parent SCM when a MN roams to a different AP subnet, via the WLCCP registration protocol. A new parent "foreign" SCM communicates home VLAN bindings to the co-located proxy MN to trigger Mobile Ethernet registration.

The home VLAN bindings for a MN are aged and discarded after some period of inactivity, so that a MN can be dynamically bound to a more optimal home VLAN. A MN can be dynamically reassigned to an old home VLAN, based on its current IP address (i.e. if the MN's home VLAN bindings are discarded too soon).

Foreign VLAN Bindings:

A MN that is associated with an AP on a foreign subnet is always bound to the AP native VLAN for the foreign subnet. The FA forwards frames destined to the MN on the native VLAN with standard transparent bridging. The FA encapsulates the frames with a Mobile Ethernet data link tunnel header to prevent incorrect backward-learning of the original source address on the "foreign" native VLAN.

Mobile Ethernet Registration:

A MN on a foreign subnet is registered with the SCM/HA for its home VLAN via a Mobile Ethernet Registration protocol. Mobile Ethernet registration establishes IP forward and reverse IP tunnels between the MN's home VLAN and foreign subnet.

[Mobile Ethernet registration can be implemented with backward compatible extensions to the standard Mobile IPv4 registration protocol [1], as described in Appendix C, so that a single HA or FA can provide access to both Mobile Ethernet MNs and standard Mobile IP MNs.]

A "proxy MN" entity in a new parent SCM must register a MN with the SCM/HA for the MN's home VLAN if a) Mobile Ethernet is enabled for the MN's SSID, b) the MN has existing home VLAN bindings, and c) the new parent SCM/HA does not have VLAN access to the MN's current home VLAN. The proxy MN in the new parent SCM sends a Mobile Ethernet Registration Request to the MN's HA to establish IP tunneling for the MN. The Registration Request includes the SCM/FA IP address, the MN Ethernet address, MN IP address (if it exists), the MN's "home VLAN ID", MN's SSID, and HA/Proxy-MN security bindings. [Mobile Ethernet security is discussed in a separate section.] If the MN's home VLAN ID is zero, then the MN is bound to the "home VLAN" that corresponds to its SSID at the "home SCM".

The HA validates the Registration Request, establishes mobility bindings for the MN, and sends a Mobile Ethernet Registration Reply to the SCM/FA. The SCM/FA forwards the home VLAN bindings (i.e. the HA IP address) to the MN's parent AP in a WLCCP Registration Reply message.

The HA mobility bindings for the MN include the MN Ethernet address, the MN IP address (if it exists), the MN VLAN ID, FA IP address, and security bindings for the FA. The HA also establishes mobility bindings for the MN in a co-located HA Bridge Port. The Ethernet address for the MN is statically enabled on the HA Bridge Port in the Forwarding Table of the co-located Ethernet Bridge.

Frame Forwarding Logic:

The following Ethernet frames are transmitted on the IP tunnels established for a MN on a foreign subnet:

1) All frames sent by a MN on a foreign subnet are forwarded to the MN's HA, using the mobility bindings for the unicast source 802 address.
2) All unicast frames sent on a home VLAN, which are destined to a MN on a foreign subnet, are forwarded by the HA to the SCM/FA for the foreign subnet, using the mobility bindings for the destination 802 address.
3) Broadcast ARP/DHCP frames sent on a home VLAN, which are destined to a MN on a foreign subnet, are converted into unicast frames and forwarded as other unicast frames. (WLCCP is used to maintain IP/MAC address bindings for ARP address translation. Broadcast DHCP replies contain the 802 address in the 'chaddr' field.)
4) IP multicast frames are forwarded to MNs on foreign subnets via standard IP multicast routing. IGMP is used to establish IP group membership for MNs.
5) Select IP and non-IP broadcast frames sent on a home VLAN can optionally be sent on a forward tunnel, and a corresponding "broadcast domain", to MNs on a foreign subnet.

Figure 2:
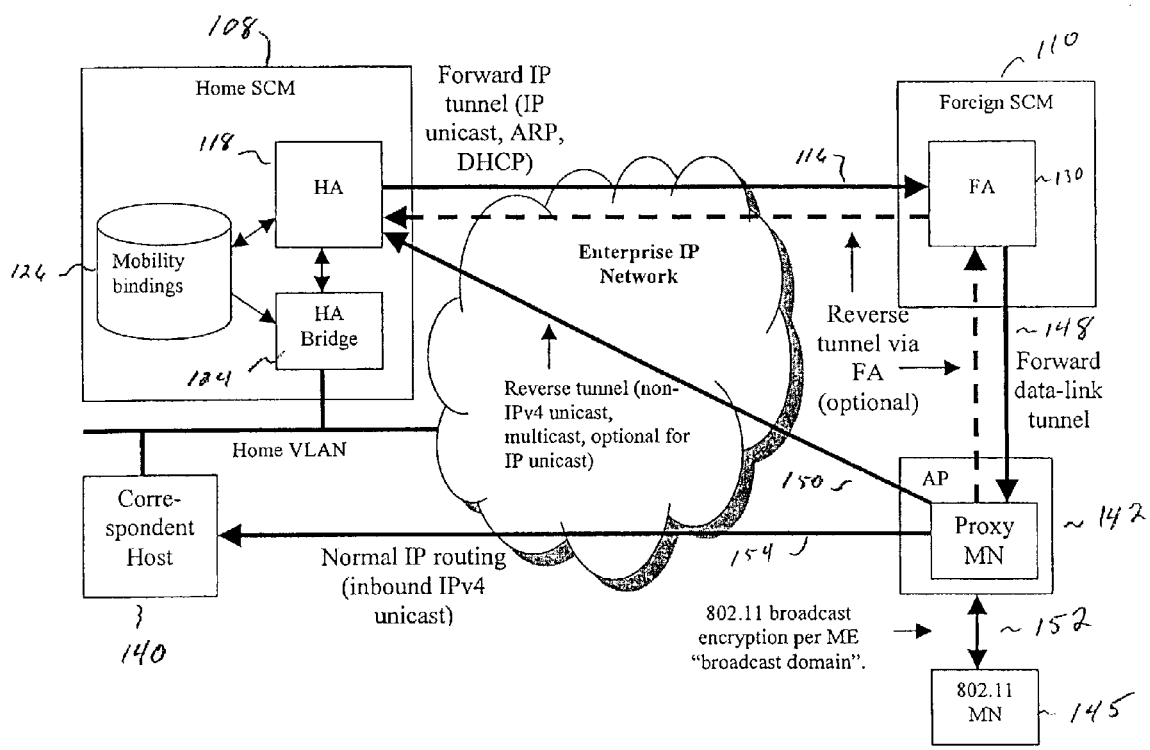
FIG. 2 is a block diagram of the Mobile Ethernet data forwarding paths.

Mobile Ethernet data frame forwarding logic is illustrated in FIG. 2.

Home VLAN Forwarding Logic:

This section describes how frames are forwarded from a "home VLAN" to a MN on a foreign subnet.

Source-learning (as defined in the IEEE 802.1D specification) is used to redirect frames for a MN on a foreign subnet to the MN's HA. When a MN is initially registered with its HA, the co-located HA Bridge Port transmits a Path Update frame(s) on the MN's home VLAN, with the source 802 address of the MN, to update the forwarding tables in bridges, switches, and APs. The HA Bridge Port also relays data frames, originated by a MN on a foreign subnet, onto the home VLAN with the source address of the MN; therefore, the source-learning mechanism is not susceptible to the loss of a Path Update frame(s).

A HA Bridge Port has mobility bindings for each MN on a foreign subnet that is bound to a local home VLAN. The bindings for each MN include the MN 802 address, MN IP address (if it exists), and MN "home VLAN" ID. If the HA Bridge receives a unicast frame, from the home VLAN and destined to the 802 address of a MN on a foreign subnet, it forwards the frame to the co-located HA. The HA Bridge Port also "snoops" the target IP address in broadcast ARP Request frames transmitted on a home VLAN. If the target IP address matches the IP address of a MN on a foreign subnet, then the HA Bridge Port overlays the destination broadcast 802 address with the MN's unicast 802 address and forwards the resulting unicast ARP Request frame to the co-located HA. The HA Bridge Port also snoops the 'chaddr' field in DHCP (BOOTP) Reply messages transmitted on a home VLAN. If the 802 address in the 'chaddr' field matches the 802 address of a MN on a foreign subnet, then the HA Bridge Port overlays the destination 802 address with the MN's unicast 802 address and forwards the resulting unicast DHCP Reply frame to the co-located HA.

An SCM/HA maintains mobility bindings for each MN on a foreign subnet. The mobility bindings are established via the Mobile Ethernet registration protocol, as described above, and are indexed by the 802 address of the respective MN. When the HA receives a unicast Ethernet frame from the co-located HA Bridge Port, it uses the mobility bindings bound to the destination 802 unicast address to determine the FA for the respective MN. The HA adds an IP/UIDP/ME encapsulation header to the unicast Ethernet frame and forwards the resulting encapsulated packet to the FA.

The source and destination IP address, in the encapsulation header, are the IP address of the HA and FA respectively (as in standard Mobile IP). The UDP protocol port (directly or indirectly) identifies "Mobile Ethernet" as the software SAP in the FA. The ME header contains the Mobile Ethernet software SAP and the MN VLAN ID—which may be zero in unicast frames.

When the FA receives the encapsulated packet, it removes the IP/UDP/ME encapsulation header and adds a Mobile Ethernet data-link encapsulation header. The destination Ethernet address is the 802 address of the MN's parent AP and the source Ethernet address is the FA address, in the data-link encapsulation header. The FA then forwards the encapsulated unicast Ethernet frame to the respective MN on the foreign subnet on the native AP VLAN, via standard bridging. The parent AP receives the frame, removes the data-link encapsulation header, and forwards the original frame to the MN. [The data-link encapsulation header is used to prevent bridges/switches from incorrectly learning the original source Ethernet address on the native VLAN.]

Foreign Subnet Forwarding Logic:

This section describes how frames transmitted by a MN on a foreign subnet are forwarded.

By default, all frames transmitted by a MN on a foreign subnet are forwarded to the MN's home VLAN through a reverse IP tunnel that exists between the MN's parent AP, on the foreign subnet, and the HA on the MN's home subnet. WLCCP MN registration is used to establish Mobile Ethernet mobility bindings for the MN in the local SCM/FA and in the MN's parent AP. The AP mobility bindings for a MN include the IP address of the MN's HA. When a parent AP receives a broadcast/multicast or non-IP unicast frame from a "foreign MN", it adds an IP/UDP/ME encapsulation header and forwards the resulting encapsulated packet to the MN's HA. The source and destination IP address, in the encapsulation header, are the IP address of the AP and HA, respectively. The UDP protocol port (directly or indirectly) identifies "Mobile Ethernet" as the software SAP in the HA.

Unicast IP frames transmitted by a MN on a foreign subnet can be forwarded a) to the MN's HA with IP/UDP/ME encapsulation (as described above) or b) to the target unicast IP address of the correspondent host, via standard IP forwarding, without encapsulation (i.e. with triangular routing). [NAT and firewall issues may require reverse tunneling of unicast IP frames.]

[As an option, a parent AP can forward frames from a foreign MN to the local SCM/FA, rather than directly forwarding the frames to the MN's HA. In that case, the parent AP must add ME data-link encapsulation headers and send the encapsulated frames to the Ethernet address of the SCM/FA. The FA can encapsulate and forward the frames to the HA, as described above. The data-link encapsulation header is used to select the correct FA Mobile Ethernet software SAP in the SCM/FA.]

When the HA receives an IP/UDP/ME encapsulated frame from a MN on a foreign subnet, it removes the encapsulation header and forwards the resulting Ethernet frame to the co-located HA Bridge Port. The HA Bridge Port determines the "home VLAN" for the source Ethernet address of the MN from its mobility bindings. The HA Bridge Port adds a VLAN tag, as required, and forwards the original Ethernet frame onto the MN's home VLAN.

Outbound Broadcast Forwarding:

This section describes an optional method for forwarding broadcast (or multicast) frames from a home VLAN to MNs on a foreign subnet.

[Mobile IP defines a (very inefficient) mechanism for delivering broadcast frames to MNs on foreign subnets. The Mobile IP mechanism requires de-encapsulation logic in the MN; therefore, it cannot be used to forward broadcast frames to a Mobile-IP-unaware MN on a foreign subnet. This section defines an optional, more efficient, method for delivering broadcast frames to MNs on foreign subnets. The method can be used for both broadcast frames and multicast frames; however, "IP multicast" frames can be forwarded more efficiently as described in the section entitled "IP Multicast Forwarding".]

Issues related to broadcast frames include: 1) A MN on a foreign subnet should NOT receive broadcast frames transmitted by local stations on the foreign subnet. 2) Broadcast frames (i.e. other that broadcast ARP and DHCP frames that are converted to unicast frames) transmitted on a home VLAN must be forwarded to MN's on a foreign subnet, with a mechanism that prevents stations on other subnets from receiving such broadcast frames.

A Mobile Ethernet "broadcast domain" is dynamically created for a set of MNs on a foreign subnet. 1) By default, foreign MNs that do not need to receive broadcast frames (i.e. the common case) are grouped into a single broadcast domain. 2) Foreign MNs that do need to receive broadcast frames are grouped into a broadcast domain per home VLAN. A broadcast domain is identified by an integer Broadcast Domain ID.

A HA can, optionally, forward broadcast (or multicast) frames transmitted on a home subnet to MNs on foreign subnets, through forward IP tunnels. The HA must maintain a list of "active FAs" for each home VLAN, to prevent "useless" broadcast forwarding. An FA is considered active on a home VLAN if at least one MN bound to the home VLAN is currently registered via the FA. The HA can deliver a single copy of an "eligible" broadcast frame to each active FA. The HA must encapsulate a broadcast frame with an IP/UDP/ME encapsulation header before forwarding the frame to an active FA. The ME header must contain the home VLAN ID. The home VLAN ID is used to select the broadcast domain on the foreign subnet.

The set of "eligible" broadcast frames that must be forwarded to foreign subnets can be defined through user-configured broadcast ingress frame filters attached to the HA bridge port. For example, a filter can be used to limit broadcast forwarding to IPv6 Router Advertisements transmitted on a home IPv6 VLAN.

A Mobile Ethernet FA must forward broadcast frames from a MN's home VLAN onto its foreign subnet. An FA must maintain a Broadcast Domain Table which maps each active HA/home-VLAN-ID pair to a dynamically created broadcast domain. When an FA receives an encapsulated broadcast frame from an HA, it must forward the frame on its foreign subnet on the broadcast domain that corresponds to the HA and home VLAN ID contained in the IP/UDP/ME encapsulation header.

Stations are prevented from incorrectly receiving broadcast frames transmitted on a foreign subnet. On Ethernet links and 802.11 AP-to-AP links, an ME data-link header, is used to segregate frames per broadcast domain. The data-link header contains an "all APs" multicast destination Ethernet address and the Broadcast Domain ID for the respective broadcast domain. A parent AP must remove the ME data-link header, before forwarding the broadcast frame to associated foreign MNs in its local BSS. A parent AP uses a separate set of 802.11 broadcast encryption keys for each active Mobile Ethernet broadcast domain and local VLAN, to transmit frames into its local BSS.

IP Multicast Forwarding:

In an enterprise campus network, standard IP multicast routing can generally be used to forward IP multicast packets to MNs on foreign subnets. IGMP is used to determine IP multicast group membership; therefore, a MN must transmit IGMP Reports, to indicate group membership, when it first roams to a new subnet. An IGMP General Query can be sent to MNs to solicit the necessary IGMP Reports.

If multicast routing is disabled in a campus network, then IP multicast packets can be forwarded using IP tunneling and broadcast domains, as described above for broadcast frame forwarding.

VLAN Considerations:

As noted above, any VLAN that is enabled on any AP must also be enabled on the HA Bridge Port for the AP subnet. However, the set of enabled VLANs, in an AP subnet, can vary from AP to AP. For example, VLAN 10 may be enabled on a first AP but not on a second AP. [Note that the AP native VLAN ID must be enabled on both the first and second AP and on the HA bridge port.] A MN, which is bound to VLAN 10, is "at home" when it is associated with the first AP, but it is "visiting" when it is associated with the second AP. The "home SCM" for a MN can be any SCM where MM's home VLAN is enabled on the co-located HA Bridge Port. For example, the home SCM for VLAN 10 may be the local SCM for the AP subnet of the first and second AP.

Frames for a visiting MN must be tunneled between the MN's "home VLAN" and the foreign subnet, even if the "home SCM" and the MN's parent AP are on the same "AP subnet". In that case, frames are tunneled outbound from the HA to a tunnel endpoint in the MN's parent AP. [Note that frames cannot be tunneled outbound to a FA.] The active parent AP for each MN is registered with the SCM/HA via WLCCP registration, as specified in [2]. Therefore, the SCM/HA can always determine the current parent AP for any MN associated with an AP on the AP subnet.

It may be desirable to "tunnel" frames to/from a home VLAN to a visiting MN on the same AP subnet via Ethernet bridging on the AP native VLAN.

IPv6 Mobility:

An IPv6 node uses the Neighbor Discovery protocol, rather than ARP, to obtain IPv6/MAC address bindings for a correspondent node. To support IPv6 mobility, multicast IPv6 Neighbor Solicitation messages must be translated to unicast Ethernet frames and forwarded to MNs on foreign subnets. The HA Bridge Port must maintain IPv6/MAC address bindings for MNs on foreign subnets, to translate Neighbor Solicitation messages. The HA Bridge Port must receive Ethernet multicast frames, where the destination 802 multicast address is derived from an IPv6 interface address.

An IPv6 node listens to Router Advertisement messages to "discover" routers and network parameters for its home subnet. The HA Bridge Port must selectively forward Router Advertisement messages from an IPv6 "home VLAN" to MN's on foreign subnets. Multicast Router Advertisements must be forwarded on a foreign subnet in a separate "broadcast domain" (see above) or a separate copy must be unicast to each MN bound to the source home VLAN.

Mobile Ethernet Security:

Static security credentials can be configured for Mobile Ethernet HAs and proxy MNs, as in standard Mobile IP; however, static credentials require significant user configuration. The method described in this section can be used to dynamically establish Mobile Ethernet security credentials, so that no additional security configuration is needed to support Mobile Ethernet.

Mobile Ethernet security is based on an underlying trust hierarchy that exists in a campus network, where each AP and SCM has dynamically established a trust relationship with the campus CCM. WLCCP is a method for dynamically establishing mutual authentication and a shared secret key for any two WLCCP nodes in a campus network.

Mobile Ethernet security assumes that a trusted parent AP and the network infrastructure are responsible for authenticating MNs. Therefore, Mobile Ethernet registration authentication only requires that Registration Request and Reply messages are generated by authorized ME proxy-MNs, FAs, and HAs.

A Proxy-MN/HA Authentication Extension protects Mobile Ethernet Registration Request and Reply messages. The Authentication Extension contains a Message Integrity Check (MIC) that is generated with a secret key that is shared by a HA for a home VLAN and a FA on a foreign subnet. The shared secret key and a Kerberos-like "Mobile Ethernet Ticket" are automatically generated by the campus CCM (or a local context manager) and delivered to the local SCM/FA in a WLCCP message, when a MN roams first roams to the respective foreign subnet. (It is not necessary to generate a key and ticket each time a MN roams to a foreign subnet.) The ticket contains the shared secret key and is encrypted with a key shared by the CCM and the HA.

The Mobile Ethernet Ticket is included in the MN/HA Authentication Extension in a Mobile Ethernet Registration Request, so that it is not necessary to separately deliver the key to the HA.

It may be desirable to authenticate data frames that are transmitted on a Mobile Ethernet tunnel with a Message Integrity Check (MIC). A parent AP cannot generate a MIC in frames that it forwards to an HA, unless it shares a secret key with the HA. The problem can be addressed in a couple ways: 1) The local SCM/FA can securely distribute a shared HA secret key to parent APs, or 2) parent APs can forward authenticated frames to the local FA, with a MIC generated with a key shared by the AP and FA. The local FA can then relay the frames to the HA, with a MIC generated with a key shared by the FA and HA. An IPSec Authentication Header can, potentially, be used for the second option.

Referring now to FIG. 2, there is shown the Mobile Ethernet Data Forwarding paths 200 for a typical campus network. As in FIG. 1, the campus IP network 102 is used for communications between the various components. A forward IP tunnel 116 is used for IP unicast, ARP and DHCP messages from the Home Agent 118 to the Foreign Agent 130. A forward data-link tunnel 148 is used for communications between the Foreign Agent 130 and the AP 142. 802.11 messages are then sent between the AP 142 and the MN 145 along path 152. The AP 142, optionally, uses normal IP routing along path 154 to communicate with CH 140. AP 142 may communicate with HA 118 using a reverse tunnel along path 150 for non-IPv4 unicast, multicast and IP unicast frames. Another option for AP 142 to communicate with HA 118 is a reverse tunnel via FA 130 along paths 202 and 204.

As those skilled in the art can readily appreciate, the present invention has many aspects, especially when compared with a Proxy-Mobile-IP-based solution.

The present invention is compatible with hierarchical network architectures. Integration reduces user configuration requirements and facilitates a more consistent, integrated management interface. Whereas standard Mobile IP only supports seamless subnet mobility for IP applications. Mobile Ethernet provides seamless subnet mobility for both IP and non-IP applications. For example, Mobile Ethernet can provide seamless mobility for IPv6 MNs bound to an IPv6 home VLAN.

Currently, standard Mobile IP is not widely used, primarily because Mobile IP is not widely supported by existing conventional (i.e. Microsoft) TCP/IP protocol stacks. In contrast, Mobile Ethernet is transparent to conventional protocol stacks.

Another aspect of Mobile Ethernet is that it solves the proxy MIP "ARP issue" because ARP frames are selectively tunneled to/from MNs on foreign subnets. A MN on a foreign subnet cannot use the ARP protocol. In at least one current proxy MIP implementation, a parent AP generates proxy ARP Replies for MNs on a foreign subnet. The proxy ARP replies create invalid ARP cache entries in MNs, which causes MNs to send Ethernet frames with incorrect destination addresses. In the current proxy MIP implementation, the parent AP always overlays the destination MAC address, in a frame received from a proxy MIP MN, with the MAC address of the default router—even if the MN is "at home".

Mobile Ethernet MNs that use "private" non-routable IP addresses and NAT can access their private home subnet via an inter-network.

By default, all frames transmitted by a MN on a foreign subnet are forwarded with reverse tunneling; therefore, Mobile Ethernet avoids a firewall problem associated with triangular routing.

Standard Mobile IP is not compatible with DHCP because a Mobile IP MN must have a permanent IP address. However, a Mobile Ethernet MN can use DHCP to dynamically acquire a permanent or temporary "home IP address" and other network configuration parameters.

In a campus network, multiple "home VLANs" may provide equivalent network access. For example, a campus network may have multiple "voice" VLANs. By default, a MN is dynamically bound to the "closest" suitable home VLAN at start-up. The present invention enables a MN to dynamically change to a different, more optimal, home VLAN.

A MN can be dynamically bound to a remote home VLAN via Mobile Ethernet and DHCP tunneling. For example, a Windows 2000/XP MN can be seamlessly bound to a home VLAN even if it executes a DHCP release/discover each time that it roams to a new parent AP on a foreign subnet. As a second example, a "guest MN" can automatically be assigned to a secure "guest VLAN"—even if VLAN trunking is not enabled on the parent AP.

Mobile Ethernet and VLAN access are integrated so that the "best" available access method is used to bridge a MN to its home VLAN.

A Mobile Ethernet HA/FA is automatically enabled in the active SCM for each AP subnet. It is not necessary to manually configure a HA/FA for each home VLAN. A new HA/FA is automatically elected, via the SCM election protocol, if an existing HA/FA fails.

Mobile Ethernet security credentials are automatically established using the underlying network security protocol for establishing "dynamic context transfer keys". Therefore, the user does not need to manually configure HA/MN security keys and security parameter indices, as in standard Mobile IP. In the current Proxy MIP implementation, a secret key and SPI must be shared by all IP addresses in the DHCP address pool, if DHCP is enabled on MNs.

Mobile Ethernet "broadcast domains" are used to isolate MNs from foreign subnets. A single copy of a broadcast/multicast packet is delivered to all MNs in a Mobile Ethernet "broadcast domain" on a foreign subnet. On 802.11 links, Mobile Ethernet broadcast domains are implemented exactly as existing VLAN broadcast domains, so that no changes are required to AP or client 802.11 firmware.

A Mobile Ethernet HA does not use the standard Mobile IP "proxy ARP" and "gratuitous ARP" mechanisms. Instead, a Mobile Ethernet HA promiscuously receives unicast and broadcast frames that are transmitted on the home subnet for MNs on a foreign to subnet. Standard source-learning is used to redirect frames to the HA in a way that is consistent with other inter-AP handoffs. As a result, Mobile Ethernet avoids problems associated with the Mobile IP "gratuitous ARP" mechanism.

A Mobile PPP protocol can be implemented by running PPPoE on top of Mobile Ethernet.

Mobile IP Compatibility:

Mobile Ethernet can be implemented with backward compatible extensions to standard RFC 3344 Mobile IP so that a single Mobile Ethernet HA/FA can provide access to both Mobile Ethernet MNs and Mobile IPv4 MNs. The standard Mobile IP Registration message format is used for Mobile Ethernet registration messages. If a single enhanced HA/FA supports both standard Mobile IP and Mobile Ethernet, then Mobile Ethernet registration messages can be encapsulated with a UDP/IP header and the UDP protocol port that identifies standard Mobile IP (434).

Initially, a standard Mobile IP HA/FA will not support Mobile Ethernet; therefore Mobile Ethernet registration messages must be encapsulated with an IP/UDP/ME header that identifies a separate Mobile Ethernet software SAP. The UDP protocol port can be set to the WLCCP protocol port, 2887. Mobile Ethernet can be migrated to the standard Mobile IP software SAP if/when support for Mobile Ethernet is added to the IOS Mobile IP software.

Standard Mobile IP is designed to be extensible by adding optional message "extension" fields, which are in a type-length-value format. The Mobile IP Registration message extensions required to support Mobile Ethernet include:

1) A Mobile Ethernet Extension—establishes Mobile Ethernet as the tunneling mechanism for the respective MN.
2) A MN Identifier Extension—must contain the 802 address of the MN.
3) A Proxy-MN/HA Authentication extension is used to authenticate Mobile Ethernet Registration messages generated by a Proxy-MN in an SCM.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for inter subnet mobility on a campus network comprising a plurality of Ethernet subnets inter-connected by Internet Protocol routers, comprising:
    logically binding mobile nodes, each having an 802 Media Access Control Address, to a single home subnet by associating the 802 Media Access Control address of each of the mobile nodes with the single home subnet as home subnet bindings;
    storing the home subnet bindings in a central context manager wherein the home subnet bindings are accessible throughout the campus network by a home agent and a foreign agent;
    maintaining mobility bindings for a first mobile node by the home agent on the home subnet wherein the mobility bindings include an 802 Media Access Control Address of the first mobile node;
    dynamically establishing a dynamic shared secret key between the foreign agent and the home agent when the first mobile node first roams to the foreign subnet;
    sending a registration message when the first mobile node first roams to the foreign subnet wherein the registration message includes the 802 Media Access Control address of the first mobile node;
    sending an Internet Protocol address of a tunnel endpoint on the foreign subnet to the home agent for the home subnet of the first mobile node;
    receiving an Ethernet frame for the first mobile node;
    determining from the mobility bindings that the first mobile node is on a foreign subnet;
    encapsulating the Ethernet frame with an Internet Protocol header addressed to the Internet Protocol address of the tunnel endpoint on the foreign subnet; and
    securely sending the encapsulated Ethernet frame using the dynamic shared secret key;
    wherein dynamically establishing the dynamic shared secret key further comprises:
    authenticating the foreign agent and the home agent with a common context manager;
    establishing a separate secret key between the foreign agent and the home agent and the common context manager;
    issuing security credentials for a mobile node's foreign agent and home agent by the common context manager; and
    establishing the dynamic shared secret key between the foreign agent and the home agent via the common context manager, wherein the dynamic shared secret key is used to authenticate messages exchanged by the home agent and the foreign agent.

2. The method of claim 1 wherein the storing step further comprising indexing by 802 Media Access Control addresses.

3. The method of claim 1 wherein the maintaining mobility bindings for a mobile node step further comprises identifying mobility bindings by 802 Media Access Control address, the mobility bindings comprising an Internet Protocol Address of a tunnel endpoint on a foreign subnet where the mobile node is currently located.

4. The method of claim 1 further comprising maintaining mobility bindings for a visiting mobile node by a foreign agent on a foreign subnet, wherein the mobility bindings for a visiting node comprises an Internet Protocol address of the home agent on the mobile node's home Access Point (AP) subnet.

5. The method of claim 1 further comprising
    intercepting 802 frames transmitted by at least one of the group consisting of a correspondent host and a router on a home subnet by the home agent wherein the destination 802 address is enabled on the mobile node on the foreign subnet; and
    encapsulating the intercepted frames with an Internet Protocol encapsulation header having an Internet Protocol destination address by the home agent;
    wherein the Internet Protocol destination address is set to the tunnel endpoint on the foreign subnet via normal Internet Protocol routing.

6. The method of claim 1 further comprising redirecting 802 frames transmitted on the home subnet using standard bridge source learning by the home agent, wherein a unicast 802 address identifies the mobile node on the foreign subnet to the home agent on the mobile node's home subnet.

7. The method of claim 1 further comprising
    intercepting at least one frame that is a non-Internet Protocol frame transmitted by the mobile node visiting the foreign subnet by the foreign agent;
    locating the mobility bindings for the mobile node using the source 802 address of the frame;
    encapsulating the non-Internet Protocol frame with an Internet Protocol encapsulation header having a header with a destination address, the destination address being set to the home agent on the mobile node's home subnet; and
    forwarding the frame using normal Internet Protocol routing.

8. The method of claim 7 wherein the frame is selected from the group consisting of a unicast 802 frame and a multicast 802 frame.

9. The method of claim 1 wherein
    the campus network comprises a plurality of Access Points, each Access Point is configured with at least one 802.11 service set identifier, the mobile node is configured with an 802.11 service set identifier that matches at least one the Access Point service set identifier;

each Access Point service set identifier is bound to one of the group consisting of a default home subnet and a home Virtual Local Area Network;

at least one service set identifier has Mobile Ethernet enabled; and the method further comprising sending at least one message by the mobile node with its service set identifier to a selected parent Access Point.

10. The method of claim 9 further comprising:

receiving a message from the mobile node by an Access Point;

examining the message's service set identifier; and initiating Mobile Ethernet services.

11. The method of claim 9 further comprising binding the mobile node to the home subnet bound to the mobile node's Service Set Identifier in the mobile node's initial parent Access Point when the mobile node first enters the network.

12. The method of claim 11 further comprising dynamically obtaining an Internet Protocol address for the mobile node that is in the mobile node's home subnet using a Dynamic Host Configuration Protocol.

13. The method of claim 12 further comprising binding the mobile node to a local home subnet, wherein layer 2 dynamic host configuration protocol request and reply frames are bridged between the local home subnet and the mobile node by the mobile node's parent Access Point.

14. The method of claim 12 further comprising:

binding the mobile node to a remote home subnet;

encapsulating Dynamic Host Configuration Protocol request and reply frames with an Internet Protocol encapsulation header; and forwarding the Dynamic Host Configuration Protocol request and reply frames between the mobile node and the remote home subnet on an Internet Protocol tunnel that exists between the home agent on the remote home subnet and the tunnel endpoint on the mobile node's local foreign subnet.

15. The method of claim 14 further comprising:

examining by the home agent an 802 Media Access Control Address in the body of a broadcast Dynamic Host Control Protocol reply message to determine if the message is destined to the mobile node on the foreign subnet;

locating mobility bindings for the mobile node;

encapsulating the Dynamic Host Control Protocol message with an Internet Protocol encapsulation header; and forwarding the Dynamic Host Control Protocol message to the tunnel endpoint identified by the Internet Protocol address in the mobile node's mobility bindings.

16. The method of claim 9 further comprising a method wherein the default home subnet bound to a single Service Set Identifier varies by location so that home subnets can be localized and so that mobile nodes can be bound to the closest home subnet.

17. The method of claim 16 further comprising discarding the home subnet bindings of the mobile node after a predetermined period of inactivity.

18. The method of claim 17 further comprising roaming to a new subnet by the mobile node and binding the mobile node to a new home subnet.

19. The method of claim 1 wherein the home subnet is a Virtual Local Area Network identified by an integer Virtual Local Area Network Identifier, the home subnet bindings for the mobile node further comprising the Virtual Local Area Network Identifier.

20. The method of claim 19 wherein the home agent provides access to a plurality of home subnet bindings for a mobile node visiting a foreign subnet.

21. The method of claim 1 further comprising:

examining the source Internet Protocol address in a packet selected from the group consisting of an Internet Protocol and Address Resolution Protocol transmitted by the mobile node; and binding the mobile node to a home subnet that corresponds to the mobile node's Internet Protocol address.

22. The method of claim 1 further comprising explicitly assigning the mobile node to the home subnet.

23. The method of claim 1 further comprising:

sending a context request message to the context manager to obtain the home subnet bindings for a mobile node when the mobile node first associates with a parent Access Point; and returning to the parent Access Point a current home subnet bindings and Mobile Ethernet registration state information for a mobile node in a context response message.

24. The method of claim 23 wherein the context request message comprises default home subnet bindings for the mobile node and the default bindings are established as the current home subnet bindings for the mobile node if the context manager does not have any previous home subnet bindings for the mobile node.

25. The method of claim 1 further comprising:

intercepting a broadcast Address Resolution Protocol message having a target Internet Protocol address by the home agent on the home subnet where the target Internet Protocol address in the Address Resolution Protocol message identifies a mobile node on a foreign subnet;

encapsulating the broadcast Address Resolution Protocol message with an Internet Protocol encapsulation header; and forwarding the encapsulated Address Resolution Protocol message to an Internet Protocol tunnel endpoint on the foreign subnet.

26. The method of claim 1 further comprising grouping mobile nodes visiting a foreign subnet into at least one isolated broadcast domain wherein layer 2 multicast frames that originate on the home subnet are not received by local stations on a foreign subnet.

27. The method of claim 1 further comprising grouping mobile nodes visiting a foreign subnet into at least one isolated broadcast domain wherein the mobile nodes visiting the foreign subnet do not receive level 2 multicast frames that originate on the foreign subnet.

28. The method of claim 27 further comprising;

encapsulating a multicast frame that originates on the home subnet with a layer 2 encapsulation header containing a broadcast domain identifier; and forwarding the encapsulated frame on the foreign subnet.

29. The method of claim 1 further comprising:

relaying an Internet Group Management Protocol message sent by the mobile node on the foreign subnet onto a local foreign subnet for the purpose of extending domain of an Internet Protocol multicast group to the local foreign subnet.

30. The method of claim 29 further comprising:

examining the Internet Group Management Protocol message sent by the mobile node to determine a set of Internet Protocol multicast packets to be forwarded to visiting mobile nodes; and forwarding Internet Protocol multicast packets transmitted on the foreign subnet to mobile nodes visiting the foreign subnet.

31. The method of claim 1 wherein Mobile Ethernet foreign agent logic and Internet Protocol tunnel endpoints are contained in a Mobile Ethernet aware mobile node.

32. The method of claim 31 further comprising isolating the Mobile Ethernet foreign agent logic in a low-level Mobile Ethernet driver module so that Mobile Ethernet is transparent to higher-layer protocol modules.

33. The method of claim 1 wherein the network further comprises a network address translator that enables the mobile node to communicate with external Internet Protocol nodes, the method further comprising:
assigning the mobile node with a non-routable private Internet Protocol address;
encapsulating all Internet Protocol frames transmitted by the mobile node on the foreign subnet; and
forwarding the encapsulated frames to the mobile nodes home subnet;
wherein any frames destined to the mobile node are routed through the network address translator.

34. The method of claim 33 further comprising assigning the same private Internet Protocol address to at least two mobile nodes wherein Mobile Ethernet agents use the 802 Media Access Control address to uniquely identify the mobile nodes.

35. The method of claim 1 wherein the home subnet is a Virtual Local Area Network identified by an integer Virtual Local Area Network Identifier, the home subnet bindings for the mobile node further comprising the Virtual Local Area Network Identifier, the method further comprising relaying frames between the mobile node and the mobile node's home Virtual Local Area Network by layer 2 bridging when the mobile node's home Virtual Local Area Network is enabled on a Virtual Local Area Network trunk linked to the mobile node's parent Access Point; and relaying frames using Internet Protocol tunneling between the mobile node and the mobile node's home Virtual Local Area Network when the mobile node's home Virtual Local Area Network is not enabled on a Virtual Local Area Network trunk linked to the mobile node's parent Access Point.

36. The method of claim 35 wherein layer 2 bridging is automatically used to access the mobile node's home Virtual Local Area Network if the Virtual Local Area Network Identification contained in the mobile node's current home subnet bindings matches a Virtual Local Area Network Identification enabled on the trunk link to the mobile node's parent Access Point.

37. The method of claim 1 further comprising automatically establishing the home agent for each home subnet via an election protocol and a new home agent is elected if the home agent is lost.

38. The method of claim 37 further comprising registering each home agent for each home subnet with a central context manager.

39. The method of claim 38 further comprising notifying Mobile Ethernet agents on foreign subnets by the central context manager when a new home agent is elected for a home subnet so that foreign agents re-register mobile nodes with the new home agent.

40. A method for inter subnet mobility on a campus network comprising a plurality of Ethernet subnets inter-connected by Internet Protocol routers, the method comprising:
logically binding a mobile node with an 802 Media Access Control Address to a single home subnet by the mobile node's 802 Media Access Control address;
storing home subnet bindings in a central context manager wherein the home subnet bindings are accessible throughout the network and indexing by 802 Media Access Control addresses by a home agent and a foreign agent;
maintaining mobility bindings for a mobile node by a home agent on a home subnet wherein the mobility bindings comprise a mobile node's 802 Media Access Control address and an Internet Protocol Address of a tunnel endpoint on a foreign subnet where the mobile node is currently located;
dynamically establishing a dynamic shared secret key between the foreign agent and the home agent when the mobile node first roams to the foreign subnet;
sending a registration message when the mobile node first roams to the foreign subnet;
wherein the registration message comprises the 802 Media Access Control address of the mobile node and an Internet Protocol address of a tunnel endpoint on the foreign subnet is sent to the home agent for the mobile node's home subnet;
maintaining mobility bindings for a visiting mobile node by a foreign agent on a foreign subnet, wherein the mobility bindings for a visiting node comprises an Internet Protocol address of the home agent on the mobile node's home subnet;
intercepting 802 frames transmitted by at least one of the group consisting of a correspondent host and a router on a home subnet by the home agent;
determining from the destination 802 address that the mobile node is on the foreign subnet;
encapsulating the intercepted frames with an Internet Protocol encapsulation header having an Internet Protocol destination address by the home agent, wherein the Internet Protocol destination address is set to the tunnel endpoint on the foreign subnet via normal Internet Protocol routing;
redirecting 802 frames transmitted on the home subnet using standard bridge source learning by the home agent, wherein a unicast 802 address identifies the mobile node on the foreign subnet to the home agent on the mobile node's home subnet;
intercepting at least one frame that is selected from the group consisting of a unicast Internet Protocol Frame, a multicast Internet Protocol frame, and a non-Internet Protocol frame transmitted by the mobile node visiting the foreign subnet by the foreign agent;
locating the mobility bindings for the mobile node using the source 802 address of the frame;
encapsulating the non-Internet Protocol frame with an Internet Protocol encapsulation header having a header with a destination address, the destination address being set to the home agent on the mobile node's home subnet; and
securely forwarding the frame using the dynamic shared secret key and normal Internet Protocol routing, wherein the frame is selected from the group consisting of a unicast 802 frame and a multicast 802 frame;
wherein dynamically establishing the dynamic shared secret key further comprises:
authenticating the foreign agent and the home agent with a common context manager;
establishing a separate secret key between the foreign agent and the home agent and the common context manager;
issuing security credentials for a mobile node's foreign agent and home agent by the common context manager; and establishing the dynamic shared secret key between the foreign agent and the home agent via the common context manager, wherein the dynamic shared secret key is used to authenticate messages exchanged by the home agent and the foreign agent.

41. A method for a home agent to extend a virtual local area network to a mobile node on a foreign subnet, the steps comprising:
   storing mobility bindings for the mobile node on the foreign subnet wherein the mobility bindings comprise a mobile node's 802 Media Access Control Address, the mobility bindings identifying a foreign agent on the foreign subnet;
   dynamically establishing a dynamic shared secret key between the foreign agent and a home agent when the mobile node first roams to the foreign subnet;
   receiving an Ethernet unicast frame from a co-located home agent bridge port;
   determining the foreign agent for the mobile node by matching the 802 Media Access Control address of the Ethernet unicast frame with the mobility bindings;
   encapsulating the Ethernet unicast frame with internet protocol encapsulation header that is addressed to the foreign agent, whereby an encapsulated frame is formed; and
   securely forwarding the encapsulated frame to the foreign agent using the dynamic shared secret key;
   wherein dynamically establishing the dynamic shared secret key further comprises:
   authenticating the foreign agent and the home agent with a common context manager;
   establishing a separate secret key between the foreign agent and the home agent and the common context manager;
   issuing security credentials for a mobile node's foreign agent and home agent by the common context manager; and
   establishing the dynamic shared secret key between the foreign agent and the home agent via the common context manager, wherein the dynamic shared secret key is used to authenticate messages exchanged by the home agent and the foreign agent.

42. The method of claim 41 further comprising indexing the mobility bindings by 802 Media Access Control address.

43. The method of claim 41 wherein the storing step further comprises maintaining a forwarding table with an entry for each mobile node on a foreign subnet that is bound to a local home virtual local area network.

44. The method of claim 43 wherein each forwarding table entry comprises the mobile node's 802 Media access control address, the mobile node's internet protocol address, and the mobile node's home virtual local area network identification.

45. The method of claim 43 wherein the internet protocol encapsulation header comprises a source address, a destination address, at least one protocol port identifiers, and a mapping entity.

46. The method of claim 45 wherein the source address is the home agent address, the destination address is the foreign agent address, the protocol port identifies Mobile Ethernet as the protocol software access point, and the mapping entity is the mobile node virtual local area network identification.

47. The method of claim 46 wherein the virtual local area network identification equals zero for a unicast frame.

48. A home agent, comprising:
   a data storage device adapted to store mobility bindings for the mobile node on a foreign subnet wherein the mobility bindings comprise a mobile node's 802 Media Access Control Address, the mobility bindings identifying a foreign agent on the foreign subnet;
   means for dynamically establishing a dynamic shared secret key between the foreign agent and a home agent when the mobile node first roams to the foreign subnet;
   means for receiving an Ethernet unicast frame from a co-located home agent bridge port;
   means for determining the foreign agent for the mobile node by matching the 802 Media Access Control address of the Ethernet unicast frame with the mobility bindings;
   means for encapsulating the Ethernet unicast frame with internet protocol encapsulation header addressed to the foreign agent, whereby an encapsulated frame is formed; and
   means for securely forwarding the encapsulated frame to the foreign agent using the dynamic shared secret key;
   wherein dynamically establishing the dynamic shared secret key further comprises:
   authenticating the foreign agent and the home agent with a common context manager;
   establishing a separate secret key between the foreign agent and the home agent and the common context manager;
   issuing security credentials for a mobile node's foreign agent and home agent by the common context manager; and
   establishing the dynamic shared secret key between the foreign agent and the home agent via the common context manager, wherein the dynamic shared secret key is used to authenticate messages exchanged by the home agent and the foreign agent.

49. The home agent of claim 48, the further comprising means for indexing the mobility bindings by 802 Media Access Control address.

50. The home agent of claim 48 wherein the data storage device further comprising means for maintaining a forwarding table with an entry for each mobile node on a foreign subnet that is bound to a local home virtual local area network.

51. The home agent of claim 50 wherein each forwarding table entry comprises the mobile node's 802 Media access control address, the mobile node's internet protocol address, and the mobile node's home virtual local area network identification.

52. The home agent of claim 50 wherein the internet protocol encapsulation header comprises a source address, a destination address, at least one protocol port identifiers, and a mapping entity.

53. The home agent of claim 52 wherein the source address is the home agent address, the destination address is the foreign agent address, the protocol port identifies Mobile Ethernet as the software access point, and the mapping entity is the mobile node virtual local area network identification.

54. The home agent of claim 53 wherein the virtual local area network identification equals zero for a unicast frame.

55. A method for a foreign agent to extend a virtual local area network, the steps comprising:
   automatically receiving a dynamic shared secret key between the foreign agent and a home agent dynamically generated when a mobile node first roams to a foreign subnet;
   receiving an encapsulated frame for the mobile node, the encapsulated frame comprising an internet protocol encapsulation header and a unicast frame;
   removing the internet protocol encapsulation header;

adding a mobile Ethernet data-link encapsulation header having a destination Ethernet address forming an encapsulated unicast Ethernet frame; and securely forwarding the encapsulated unicast Ethernet frame to a parent access point for the mobile node using the dynamic shared secret key;

wherein the destination Ethernet address is the Ethernet address of the mobile node's parent Access Point;

wherein dynamically generating the dynamic shared secret key further comprises:

authenticating the foreign agent and the home agent with a common context manager;

establishing a separate secret key between the foreign agent and the home agent and the common context manager;

issuing security credentials for a mobile node's foreign agent and home agent by the common context manager; and establishing the dynamic shared secret key between the foreign agent and the home agent via the common context manager, wherein the dynamic shared secret key is used to authenticate messages exchanged by the home agent and the foreign agent.

56. A foreign agent component, comprising:

means for establishing mobility bindings for a mobile node with the Foreign Agent and the mobile node's parent Access Point, wherein Access Point mobility bindings include the Internet Protocol address of the mobile node's Home Agent and the mobile node's 802 Media Access Control Address;

a data storage device adapted to store the mobility bindings;

means for automatically receiving a dynamic shared secret key between the foreign agent and a home agent dynamically generated when the mobile node first roams to a foreign subnet;

means for receiving a non-Internet Protocol frame from a foreign mobile node;

means for determining the Internet Protocol address of the mobile node's Home Agent for the foreign mobile node based on the 802 Media Access Control address of the mobile node from the means for establishing the mobility bindings;

means for adding an Internet Protocol encapsulation header having a destination address to the non-Internet Protocol frame; and means for securely forwarding the encapsulated packet to the mobile node's Home Agent using the dynamic shared secret key;

wherein the destination address is Internet Protocol address of Home Agent;

wherein dynamically generating the dynamic shared secret key further comprises:

authenticating the foreign agent and the home agent with a common context manager;

establishing a separate secret key between the foreign agent and the home agent and the common context manager;

issuing security credentials for a mobile node's foreign agent and home agent by the common context manager; and establishing the dynamic shared secret key between the foreign agent and the home agent via the common context manager, wherein the dynamic shared secret key is used to authenticate messages exchanged by the home agent and the foreign agent.

57. A method for a home agent to route a frame from a mobile node on a foreign agent to a home virtual local area network, comprising:

dynamically establishing a dynamic shared secret key between the foreign agent and a home agent when the mobile node first roams to a foreign subnet;

receiving an encapsulated packet, the packet comprising an Internet Protocol header and a non-Internet Protocol frame;

authenticating the encapsulated packet using the dynamic shared secret key;

removing the Internet Protocol encapsulation header;

forwarding the frame to a co-located Home Agent Bridge Port;

determining a home Virtual Local Area Network for the source Ethernet address of the Mobile Node from its mobility bindings by the Home Agent Bridge Port;

adding a Virtual Local Area Network tag by the Home Agent Bridge Port; and securely forwarding the frame onto the mobile node's home Virtual Local Area Network using the dynamic shared secret key;

wherein dynamically generating the dynamic shared secret key further comprises:

authenticating the foreign agent and the home agent with a common context manager;

establishing a separate secret key between the foreign agent and the home agent and the common context manager;

issuing security credentials for a mobile node's foreign agent and home agent by the common context manager; and establishing the dynamic shared secret key between the foreign agent and the home agent via the common context manager, wherein the dynamic shared secret key is used to authenticate messages exchanged by the home agent and the foreign agent.

* * * * *